United States Patent [19]

Hoover et al.

[11] Patent Number: 4,958,004
[45] Date of Patent: Sep. 18, 1990

[54] AROMATIC SULFIDE/SULFONE POLYMER PRODUCTION

[75] Inventors: Kenneth C. Hoover; Lacey E. Scoggins, both of Bartlesville, Okla.; Wei-Tech W. Shang, Nagoya, Japan; Afif M. Nesheiwat, Bartlesville, Okla.

[73] Assignee: Phillips Petroleum Company, Bartlesville, Okla.

[21] Appl. No.: 80,283

[22] Filed: Jul. 31, 1987

[51] Int. Cl.$^5$ .................................... G08G 75/14
[52] U.S. Cl. ................................ 528/388; 528/391
[58] Field of Search ................................ 528/388

[56] References Cited

U.S. PATENT DOCUMENTS

| | | | |
|---|---|---|---|
| 3,919,177 | 11/1975 | Campbell | 260/79.1 |
| 4,016,145 | 4/1977 | Campbell | 260/79.3 M |
| 4,038,259 | 7/1977 | Campbell et al. | 260/79.1 |
| 4,038,262 | 7/1977 | Edmonds, Jr. | 260/79.1 |
| 4,064,114 | 12/1977 | Edmonds, Jr. | 260/79.1 |
| 4,102,875 | 7/1978 | Campbell | 528/388 |
| 4,301,274 | 11/1981 | Campbell | 528/388 |
| 4,393,197 | 7/1983 | Edmonds, Jr. | 528/388 |
| 4,495,332 | 1/1985 | Shiiki et al. | 528/388 |
| 4,514,558 | 4/1985 | Shiiki et al. | 528/388 |
| 4,525,579 | 7/1985 | Idel et al. | 528/388 |

FOREIGN PATENT DOCUMENTS 0100536 10/1986 European Pat. Off.

*Primary Examiner*—Lewis T. Jacobs
*Assistant Examiner*—David W. Woodward
*Attorney, Agent, or Firm*—J. D. Brown

[57] ABSTRACT

A process is provided for the production of aromatic sulfide/sulfone polymers which involves contacting under suitable polymerization reaction conditions: (1) at least one dihaloaromatic sulfone, (2) at least one organic amide, (3) at least one alkali metal hydrosulfide, (4) water, and (5) at least one member selected from the group consisting of (a) alkali metal carbonates and (b) mixtures of alkali metal carbonates with alkali metal hydroxides wherein said mixtures have at least about 0.5 mole percent alkali metal carbonate.

13 Claims, No Drawings

AROMATIC SULFIDE/SULFONE POLYMER PRODUCTION

This invention relates to the production of aromatic sulfide/sulfone polymers. In accordance with another aspect, this invention relates to the production of aromatic sulfide/sulfone polymers exhibiting improved melt flow stability. In accordance with a further aspect, this invention relates to the production of aromatic sulfide/sulfone polymers in a simplified and readily controlled manner.

BACKGROUND

Thermoplastic polymers having a high degree of heat resistance or thermal stability are the object of intensive research and development in many laboratories throughout the world. Since thermoplastic materials comprising these polymers can be molded rapidly and efficiently to articles of simple or complex design, mass production techniques can be utilized to provide a wide variety of useful products. Heat resistant thermoplastic polymers thus offer important advantages that can be used in applications such as electrical components, wire coatings, automotive parts, aircraft parts and the like. Often such polymers can be used in the form of composite materials which contain high temperature resistant fibers and fillers.

However, to be fully exploited for such applications the thermoplastic polymer should have good melt stability characteristics i.e. be able to withstand for a period of time the high temperatures encountered in molding operations without excessive degradation and/or premature curing.

Arylene sulfide/sulfone polymers are thermoplastic polymers known in the art, and processes for making these polymers are disclosed in various U.S. patents of R. W. Campbell, e.g. 4,016,145, 4,127,713 and 4,301,274. Although these patents represent significant and valuable advances in the art, there is a need for a simplified process which can provide aromatic sulfide/sulfone polymers having good melt flow stability as well as high molecular weight.

Accordingly, an object of our invention is to produce aromatic sulfide/sulfone polymers exhibiting high molecular weight.

Another object of our invention is to provide a process for producing high molecular weight aromatic sulfide/sulfone polymers exhibiting improved melt flow stability.

It is a further object of our invention to provide a simplified, readily controllable process for producing high molecular weight aromatic sulfide/sulfone polymers exhibiting improved melt flow stability.

Other objects and aspects, as well as the several advantages of our invention are apparent from a study of this disclosure and the appended claims.

BRIEF STATEMENT OF THE INVENTION

Briefly, we have discovered in the preparation of aromatic sulfide/sulfone polymers that by using an alkali metal carbonate or an alkali metal carbonate plus an alkali metal hydroxide, high molecular weight heat stable polymers are formed, eliminating the use of an alkali metal carboxylate in the polymerization step, and eliminating the need for a post-treatment end-capping step.

In accordance with our invention aromatic sulfide/sulfone polymers are produced in a process which comprises contacting compounds consisting essentially of: (1) at least one dihaloaromatic sulfone, (2) at least one organic amide, (3) at least one alkali metal hydrosulfide, (4) water, and (5) at least one member selected from a group consisting of (a) alkali metal carbonates and (b) mixtures of alkali metal carbonates with alkali metal hydroxides wherein said mixtures have at least about 0.5 mole percent alkali metal carbonate, under polymerization conditions of temperature and time sufficient to form said polymers.

Our invention thus provides a process for producing aromatic sulfide/sulfone polymers having a high molecular weight as well as good melt flow stability without the need for an alkali metal carboxylate to promote formation of high molecular weight polymer and without an added step such as end-capping to promote melt flow stability of the polymer.

DETAILED DESCRIPTION OF THE INVENTION

Dihaloaromatic sulfones employed in the process of our invention can be represented by the formula

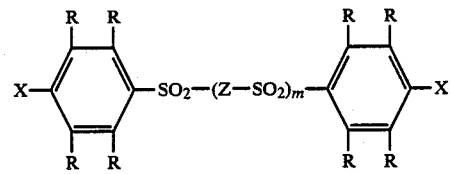

where each X is selected from the group consisting of fluorine, chlorine, bromine, and iodine; Z is a divalent radical selected from the group consisting of

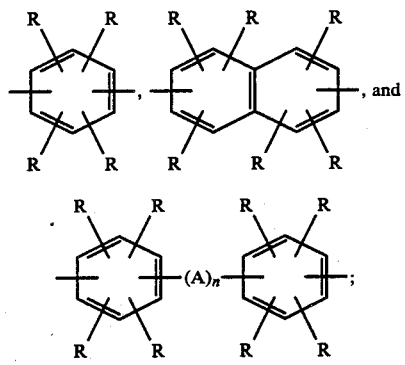

m is 0 or 1; n is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, m is 0.

Examples of some dihaloaromatic sulfones that can be employed in the process of our invention include bis(p-fluorophenyl) sulfone,
bis(p-chlorophenyl) sulfone, bis(p-bromophenyl) sulfone,
bis(p-iodophenyl) sulfone, p-chlorophenyl p-bromophenyl sulfone,
p-iodophenyl 3-methyl-4-fluorophenyl sulfone,
bis(2-methyl-4-chlorophenyl) sulfone, bis(2,5-diethyl-4-bromophenyl)

sulfone, bis(3-isopropyl-4-iodophenyl) sulfone,
bis(2,5-dipropyl-4-chlorophenyl) sulfone, bis(2-butyl-4-fluorophenyl)
sulfone, bis(2,3,5,6-tetramethyl-4-chlorophenyl) sulfone,
2-isobutyl-4-chlorophenyl 3-butyl-4-bromophenyl sulfone,
1,4-bis(p-chlorophenylsulfonyl)benzene,
1-methyl-2,4-bis(p-fluorophenylsulfonyl)benzene,
2,6-bis(p-bromophenylsulfonyl)naphthalene,
7-ethyl-1,5-bis(p-iodophenylsulfonyl)naphthalene,
4,4''-bis(p-chlorophenylsulfonyl)biphenyl,
bis[p-(p-bromophenylsulfonyl)phenyl]ether,
bis[p-(p-chlorophenylsulfonyl)phenyl]sulfide,
bis[p-(p-chlorophenylsulfonyl)phenyl]sulfone,
bis[p-(p-bromophenylsulfonyl)-phenyl]methane,
5,5-bis[3-ethyl-4-(p-chlorophenylsulfonyl)phenyl]nonane, and the like, and mixtures thereof. Bis(p-chlorophenyl) sulfone is preferred for reasons of availability and generally good results.

The organic amides used in the method of our invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-ethyl-2-pyrrolidone, N-cyclohexyl-2-pyrrolidone, N-methyl-2-pyrrolidone, $\theta$-caprolactam, N-methyl-$\theta$-caprolactam, N,N'-ethylenedi-2-pyrrolidone, hexamethylphosphoramide, tetramethylurea, and the like, and mixtures thereof. N-methyl-2-pyrrolidone is especially preferred because of excellent results and ready availability.

Alkali metal hydrosulfides that can be employed according to our invention include sodium hydrosulfide, lithium hydrosulfide, potassium hydrosulfide, rubidium hydrosulfide, cesium hydrosulfide and mixtures thereof. Sodium hydrosulfide is preferred because of ready availability and good results obtained therewith. The alkali metal hydrosulfide can conveniently be utilized in our invention as an aqueous solution. For example, an aqueous solution of NaSH having about 60 weight percent NaSH is convenient to use.

Alkali metal carbonates that can be employed according to our invention include lithium carbonate, sodium carbonate, potassium carbonate, rubidium carbonate, cesium carbonate, and mixtures thereof. Sodium carbonate is preferred because of ready availability and generally good results obtained therewith.

Alkali metal hydroxides that can be employed according to our invention in admixture with at least one alkali metal carbonate include lithium hydroxide, sodium hydroxide, potassium hydroxide, rubidium hydroxide, cesium hydroxide, and mixtures thereof. Sodium hydroxide is preferred because of availability and good results obtained using this compound.

According to one aspect of our invention, if a mixture of at least one alkali metal carbonate and at least one alkali metal hydroxide is employed instead of at least one alkali metal carbonate alone, said mixture should contain at least about 0.5 mole percent alkali metal carbonate. Preferably, said mixture will have about 5 to about 40 mole percent alkali metal carbonate and more preferably about 15 to about 25 mole percent alkali metal carbonate.

The amount of alkali metal carbonate or mixture of alkali metal carbonate with alkali metal hydroxide employed according to our invention can be expressed in terms of a molar ratio based on the alkali metal hydrosulfide compound. Thus, the molar ratio of alkali metal carbonate or alkali metal carbonate plus alkali metal hydroxide, if a mixture is employed, to alkali metal hydrosulfide is generally about 1.1:1 to about 1.0:1 and preferably about 1.02:1 to about 1.0:1.

A further embodiment of our invention involves the in situ formation of the alkali metal carbonate in the mixture of compounds to be subjected to polymerization reaction conditions for the production of aromatic sulfide/sulfone polymers. According to this embodiment, carbon dioxide, preferably in gaseous form, is charged to the mixture containing alkali metal hydroxide present in an amount sufficient to react with the $CO_2$ and under suitable conditions of temperature and pressure to effectively form the alkali metal carbonate. Further according to this embodiment, if excess alkali metal hydroxide is present in the mixture contacted with $CO_2$, then a mixture of alkali metal carbonate and alkali metal hydroxide is effectively generated in situ. Those skilled in the art can readily determine the relative amounts of alkali metal hydroxide and $CO_2$ to be employed to provide the alkali metal carbonate or mixture thereof with alkali metal hydroxide to be formed in situ.

Although the amount of dihaloaromatic sulfone employed according to our invention can vary widely, generally good results are obtained with a molar ratio of dihaloaromatic sulfone to alkali metal hydrosulfide of about 0.9:1 to about 1.2:1. Preferably, this molar ratio is about 0.95:1 to about 1.05:1.

The amount of organic amide employed in our invention can also vary widely. Generally, the molar ratio of organic amide to alkali metal hydrosulfide will be about 4:1 to about 16:1, and preferably about 6:1 to about 12:1.

The amount of water employed in our invention can also vary widely although generally good results are obtained at a molar ratio of water to organic amide of about 0.2:1 to about 2:1. Preferably, this ratio will be about 0.6:1 to about 1.2:1.

The process of our invention for producing aromatic sulfide/sulfone polymers is preferably carried out employing compounds consisting essentially of (1) at least one dihaloaromatic sulfone, (2) at least one organic amide, (3) at least one alkali metal hydrosulfide, (4) water, and (5) at least one member selected from the group consisting of (a) alkali metal carbonates and (b) mixtures of alkali metal carbonates with alkali metal hydroxides wherein said mixtures have at least about 0.5 mole percent alkali metal carbonate.

The charge sequence of the various compounds employed in the process of our invention can vary as desired. One convenient method is to simply charge all the compounds in any desired sequence to a suitable reaction vessel equipped with agitation means at about room temperature and then heat the mixture with stirring to the desired reaction temperature and hold the mixture for the desired length of time at the temperature desired. It is also possible to preheat a mixture of only certain of the compounds in a separate vessel, then charge this mixture to a preheated mixture of the remainder of the compounds in the reaction vessel. In the embodiment described above wherein the alkali metal carbonate or mixture thereof with alkali metal hydroxide is formed in situ, it is preferred that the $CO_2$ be added to the mixture of compounds which comprises the alkali metal hydroxide.

Although the reaction temperature at which the polymerization is conducted can vary over a considerable range, generally it will be within the range of about 170° C. to about 240° C., preferably about 185° C. to about 225° C. The reaction time can vary widely, depending in part on the reaction temperature, but generally will be within the range of about 0.5 hour to about 10 hours, preferably 1 hour to about 4 hours. The pressure should be sufficient to maintain the dihaloaromatic sulfone and organic amide substantially in the liquid phase.

While not wishing to be bound by theory, we currently believe that the aromatic sulfide/sulfone polymer formed by the above described process of our invention has recurring units consisting of

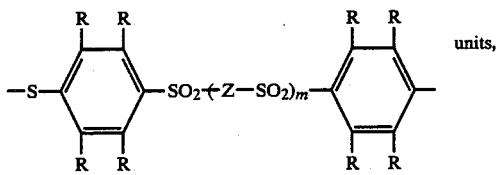

units, where each R, Z and m is as defined above.

The aromatic sulfide/sulfone polymers are produced by the process of our invention in particle form and can be separated from the reaction mixture by conventional procedures, e.g. by filtration of the reaction mixture to recover the polymer followed by washing at least once with water. A preferred recovery method involves diluting the hot reaction mixture with a mixture of water and organic amide and cooling the quenched mixture with stirring. The separated polymer particles can then be washed with water preferably with at least a portion of the washing being conducted at an elevated temperature within the range of about 130° C. to about 250° C. to provide a polymer which is low in ash-forming substances and is relatively light in color as well as exhibiting good melt flow stability under conditions of melt processing operations such as injection molding.

The aromatic sulfide/sulfone polymers produced by the process of our invention can be blended with fillers, fibers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, film, molded objects, and fibers. The polymers exhibit a good balance of properties for these uses, the heat deflection temperature being particularly outstanding.

EXAMPLE I

A series of polymerization runs were performed in a 90 gallon stirred (500 rpm) reactor for the preparation of poly(p-phenylene sulfide/sulfone) (PPSS). The polymerization recipe for these runs is presented below.

| | Compound, lb.-mole |
|---|---|
| N-methyl-2-pyrrolidone (NMP) | 1.9838–2.6738 |
| Sodium hydroxide (NaOH)[a] | 0–0.3216 |
| Sodium carbonate (Na$_2$CO$_3$) | 0–0.0896 |
| Sodium hydrosulfide (NaSH)[b] | 0.3007–0.3217 |
| bis(p-chlorophenyl) sulfone (BCPS) | 0.2988–0.3211 |
| Sodium acetate (NaOAc) | 0–0.3207 |

| | Compound, lb.-mole |
|---|---|
| Water (H$_2$O) | 1.64–2.72 |

[a]Charged as an aqueous solution of 49.887–50.364 wt. % NaOH.
[b]Charged as an aqueous solution of 58.471–60.218 wt. % NaSH and 0.316–0.526 wt. % Na$_2$S.

(a) Charged as an aqueous solution of 49.887 - 50.364 wt. % NaOH. (b) Charged as an aqueous solution of 58.471 - 60.218 wt. % NaSH and 0.316 - 0.526 wt. % Na$_2$S.

In each run the aqueous NaOH and a portion of the NMP was premixed in a separate vessel for 5 hours at 115°–125° C. The aqueous NaSH was then charged and the resulting mixture held for 30 minutes to form a NaSH:NaOH:NMP complex. In the polymerization reactor, BCPS, a portion of the NMP, Na$_2$CO$_3$, and optionally NaOAc was charged and heated to approximately 88° C. The complex was then charged to the polymerization reactor with a subsequent flush using the remaining NMP. The reaction mixture was then heated to 200° C. at 1.2°–1.8° C./minute in 58–90 minutes. The reaction mixture was held at 200° C. for 210 minutes.

At the end of polymerization, the agitator speed was increased to 550 rpm and 0.9–1.68 lb. mole NMP and 2.78–5.93 lb. mole water was added to the reactor. The reaction mixture was then cooled to 103°–107° C. at 0.85°–1.2° C./minute. The resulting polymer slurry was filtered to facilitate recovery of the NMP. The polymer was reslurried in ambient deionized (DI) water and filtered using a hot (82° C.) DI water rinse. The polymer was then given two hot washes (176° C.) using deaerated DI water and filtered using a hot DI water rinse. The second hot wash slurry was treated with zinc acetate. The washing steps utilized a slurry mixing tank and a nylon fabric filter cloth on a moving horizontal belt filter system to separate the PPSS from the wash-/rinse liquid. The washed PPSS from each run was dried and a sample tested for inherent viscosity.

The results obtained are presented in TABLE I. The NMP/NaSH mole ratio ranged from 6.17–6.20 except as noted. The BCPS/NaSH mole ratio ranged from 0.9963–0.9989 and the H$_2$O/NMP mole ratio ranged from approximately 0.6–1.4.

Inherent viscosities for PPSS samples were determined using a #100 Cannon-Fenske routine type viscometer at 30° C. with N-methyl-2-pyrrolidone (NMP) as the solvent at a polymer concentration of 0.5 g per dL NMP. Inherent viscosities provide an indication of relative molecular weights of PPSS polymers of the same type.

TABLE I

| | Run No. | Reactor Charges, mole ratio | | | mole % Na$_2$CO$_3$[a] | I.V., dL/g |
|---|---|---|---|---|---|---|
| | | NaOH/NaSH | Na$_2$CO$_3$/NaOH | NaOAc/NaSH | | |
| Control: | 1 | 0.995 | 0.0 | 0.999 | 0.0 | 0.41 |
| | 2 | 1.002 | 0.0 | 0.999 | 0.0 | 0.41 |
| | 3 | 1.002 | 0.0 | 0.999 | 0.0 | 0.46 |
| Invention: | 4[b] | 0.905 | 0.10 | 0.992 | 9.9 | 0.34 |
| | 5[b] | 0.906 | 0.132 | 0.997 | 12.7 | 0.43 |
| | 6[b] | 0.905 | 0.129 | 0.997 | 12.5 | 0.41 |
| | 7 | 0.757 | 0.279 | 0.997 | 26.9 | 0.45 |
| | 8 | 0.757 | 0.279 | 0.997 | 26.9 | 0.47 |
| | 9 | 0.759 | 0.279 | 0.999 | 26.9 | 0.41 |
| | 10 | 0.770 | 0.279 | 0.999 | 26.6 | 0.44 |
| | 11 | 0.757 | 0.265 | 1.00 | 25.9 | 1.45 |
| Control: | 12 | 0.999 | 0.0 | 0.0 | 0.0 | 0.32 |
| | 13 | 0.999 | 0.0 | 0.02 | 0.0 | 0.35 |
| | 14 | 1.000 | 0.0 | 0.05 | 0.0 | 0.34 |

TABLE I-continued

| Run No. | Reactor Charges, mole ratio | | | mole % $Na_2CO_3{}^a$ | I.V., dL/g |
|---|---|---|---|---|---|
| | NaOH/NaSH | $Na_2CO_3$/NaOH | NaOAc/NaSH | | |
| Invention: 15 | 0.748 | 0.279 | 0.0 | 27.1 | 0.36 |
| 16 | 0.745 | 0.279 | 0.0 | 27.2 | 0.38 |
| 17 | 0.746 | 0.25 | 0.0 | 25.1 | 0.35 |
| 18 | 0.753 | 0.25 | 0.0 | 24.9 | 0.37 |

$^a$mole % $Na_2CO_3$ = mole $Na_2CO_3$/(mole NaOH + mole $Na_2CO_3$).
$^b$The mole ratios of NMP/NaSH for runs 4, 5 and 6 are 7.71, 7.75 and 8.31 respectively.

The results in TABLE I indicate that runs made with a mixture of $Na_2CO_3$ and NaOH produced polymer of acceptable molecular weight that is at least as high as runs made without any alkali metal carbonate present. This is the case for polymerizations with or without alkali metal carboxylate. While without alkali metal carboxylate have slightly lower molecular weight than those with alkali metal carboxylate, the polymer is still acceptable for molding applications.

EXAMPLE II

A series of polymerization runs were performed in a one gallon, fast stirring reactor for the preparation of PPSS. The polymerization recipe for these runs is presented below.

| | Compound, g-mole |
|---|---|
| Sodium hydroxide (NaOH) | 0.0, 0.75 |
| Sodium carbonate ($Na_2CO_3$) | 0.25, 1.0 |
| Sodium hydrosulfide (NaSH)$^a$ | 1.0 |
| bis(p-chlorophenyl) sulfone (BCPS) | 1.0 |
| N-methyl-2-pyrrolidone (NMP) | 8.0 |
| Water ($H_2O$) | 3.0 |
| Sodium acetate (NaOAc) | 0.0, 1.0 |

$^a$Charged as a NaSH—$H_2O$ solution containing 58.76 wt. % NaSH.

In each run the reactor was charged with the above reactants and the reactor was purged four times with $N_2$. The reaction mixture was heated to 200° C. and held for 3 hours and the final pressure of the reactor was 100–175 psig. At the end of polymerization a mixture of 500 mL NMP and 175–200 mL $H_2O$ was charged slowly to the reactor. The heating was terminated and the reaction mixture cooled slowly with air circulating through the internal cooling coils.

The reactor was opened and granular and fine particle PPSS removed from the reactor. A 100 mesh screen was used to recover the granular polymer which was washed with water 3 times and rinsed 1 time with acetone on the screen. The recovered polymer was charged to the reactor with $H_2O$, purged twice with $N_2$, and given a high temperature (180° C.) wash with aqueous zinc acetate. The polymer was recovered and washed twice with water and rinsed with acetone followed by drying in a vacuum oven at 200° C for 6 hours.

The results obtained are presented in Table II.

TABLE II

| Run No. | Reactor Charges, mole ratio | | | mole % $Na_2CO_3{}^a$ | I.V., dL/g |
|---|---|---|---|---|---|
| | NaOH/NaSH | $Na_2CO_3$/NaOH | NaOAc/NaSH | | |
| Control: 19 | 0.75 | 0.25 | 1.0 | 25 | 0.617 |
| 20 | 0.75 | 0.25 | 1.0 | 25 | 0.447 |
| Invention: 21 | 0.75 | 0.25 | 0.0 | 25 | 0.523 |
| 22 | 0.75 | 0.25 | 0.0 | 25 | 0.493 |
| 23 | 0.75 | 0.25 | 0.0 | 25 | 0.498 |
| 24 | 0.75 | 0.25 | 0.0 | 25 | 0.503 |
| 25 | 0.75 | 0.25 | 0.0 | 25 | 0.480 |
| 26 | 0.0 | 1.0 | 0.0 | 100 | 0.610 |

$^a$mole % $Na_2CO_3$ = mole $Na_2CO_3$/(mole NaOH + mole $Na_2CO_3$).

The results in TABLE II indicate that high quality PPSS can be produced without the addition of alkali metal carboxylate using a mixture of NaOH and $Na_2CO_3$ or $Na_2CO_3$ alone.

EXAMPLE III

Several runs were conducted according to the embodiment of our invention wherein the alkali metal carbonate was generated in situ by charging $CO_2$ to polymerization reaction mixtures comprising alkali metal hydroxide.

In these runs a 1 gallon autoclave reactor equipped with stirring means, heating means and cooling means (coils) was charged with the following materials:

| | |
|---|---|
| Sodium hydrosulfide (NaSH) | 1 g-mole |
| Sodium hydroxide (NaOH) | 1.246 g-mole |
| Bis(4-chlorophenyl) sulfone (BCPS) | 1.00 g-mole |
| N-Methyl-2-pyrrolidone (NMP) | 8.00 g-mole |
| Water | 4.96–5.21 g-mole |

The NaSH was charged as a 58.47 wt. percent aqueous solution and the NaOH as solid pellets. After the above mixture was charged the reactor was closed and purged with nitrogen 3 times.

Solid $CO_2$ was then charged to a sample cylinder connected to the reactor capable of withstanding high pressure and the cylinder contents charged to the reactor with pressure generated by the $CO_2$. The cylinder was then purged 2–3 times with nitrogen into the reactor. The reactor was heated to 200° C. and held for 3 hours. At this point reactor pressure was 150–175 psig. Next, 500 mL NMP and 200–250 mL $H_2O$ was charged to the reactor as heating was terminated and the reactor cooled to ambient temperature by passing air through the internal coils.

The reactor was opened and granular as well as fine particle poly(phenylene sulfide/sulfone) PPSS removed from the reactor. A 100 mesh screen was used to recover the granular polymer which was washed with water 3–4 times and rinsed with acetone on the screen. The fine particles were recovered by filtration on a large Buchner funnel and also washed three times with water on the filter. Recovered polymer was dried in a vacuum oven for about 4 hours at 200° C.

Results obtained in these runs are presented in Table III below. The inherent viscosity (I.V.) values are for samples of the granular polymer.

TABLE III

| Run No. | $CO_2$, g | $CO_2$, g-moles | $Na_2CO_3$ mole %$^a$ | PPSS, g Granular | PPSS, g Fines | Total Yield, % | Inherent Viscosity, dL/g |
|---|---|---|---|---|---|---|---|
| 27 | 15 | 0.34 | 37.4 | 213 | 30 | 98 | 0.52 |
| 28 | 12 | 0.27 | 27.6 | 206 | 35 | 97 | 0.51$^b$ |

TABLE III-continued

| Run No. | CO$_2$, g | CO$_2$, g-moles | Na$_2$CO$_3$ mole %[a] | PPSS, g Granular | PPSS, g Fines | Total Yield, % | Inherent Viscosity, dL/g |
|---|---|---|---|---|---|---|---|
| 29 | 11.5 | 0.26 | 26.3 | 218 | 25.6 | 98 | 0.40[b] |

[a]Calculated based on assumed complete conversion of CO$_2$ to Na$_2$CO$_3$.
[b]Determined on samples of polymer that had been treated with a high temperature water wash (180° C.) followed by a high temperature (180° C.) wash with aqueous zinc acetate.

The results presented in Table III show that high quality poly(phenylene sulfide/sulfone) can be made using the addition of CO$_2$ to a reaction mixture comprising NaOH to generate Na$_2$CO$_3$ in situ. In these runs, since the NaOH was in excess relative to the CO$_2$ charged, a mixture of Na$_2$CO$_3$ and NaOH would have resulted from the addition of CO$_2$ as shown.

That which is claimed is:

1. A process for the production of an aromatic sulfide/sulfone polymer which comprises contacting a reaction mixture consisting essentially of:
   (1) at least one dihaloaromatic sulfone,
   (2) at least one organic amide,
   (3) at least one alkali metal hydrosulfide,
   (4) water, and
   (5) at least one member selected from the group consisting of
      (a) alkali metal carbonates and
      (b) mixtures of alkali metal carbonates with alkali metal hydroxides wherein said mixtures have at least about 0.5 mole percent alkali metal carbonate, under polymerization conditions of temperature and time sufficient to form said polymer, wherein the molar ratio of said organic amide to said alkali metal hydrosulfide is about 4:1 to about 16:1, and wherein the molar ratio of said water to said organic amide is about 0.6:1 to about 1.2:1.

2. A process according to claim 1 wherein the molar ratio of alkali metal carbonate or the sum of alkali metal carbonate and alkali metal hydroxide in said mixture to said alkali metal hydrosulfide is about 1.0:1 to about 1.1:1.

3. A process according to claim 2 wherein the molar ratio of said dihaloaromatic sulfone to said alkali metal hydrosulfide is about 0.9:1 to 1.2:1.

4. A process according to claim 3 wherein said at least one member (5) is a mixture of alkali metal carbonate with alkali metal hydroxide having a mole percent alkali metal carbonate of about 5 to about 40.

5. A process according to claim 3 wherein said at least one member (5) is an alkali metal carbonate.

6. A process according to claim 4 wherein said at least one dihaloaromatic sulfone is bis(4-chlorophenyl) sulfone, said at least one organic amide is N-methyl-2-pyrrolidone, said at least one alkali metal hydrosulfide is sodium hydrosulfide, said alkali metal carbonate is sodium carbonate and said alkali metal hydroxide is sodium hydroxide.

7. A process according to claim 5 wherein said at least one dihaloaromatic sulfone is bis(4-chlorophenyl) sulfone, said at least one organic amide is N-methyl-2-pyrrolidone, said at least one alkali metal hydrosulfide is sodium hydrosulfide, and said alkali metal carbonate is sodium carbonate.

8. A process for the production of an aromatic sulfide/sulfone polymer which comprises contacting a reaction mixture consisting essentially of:
   (1) at least one dihaloaromatic sulfone,
   (2) at least one organic amide,
   (3) at least one alkali metal hydrosulfide,
   (4) water, and
   (5) mixtures of alkali metal carbonates with alkali metal hydroxides wherein said mixtures have at least about 0.5 mole percent alkali metal carbonate, under polymerization conditions of temperature and time sufficient to form said polymer, wherein said mixture of alkali metal carbonate with alkali metal hydroxide is formed in situ by contacting said reaction mixture comprising an alkali metal hydroxide with carbon dioxide under suitable conditions to form said alkali metal carbonate, wherein the molar ratio of said organic amide to said alkali metal hydrosulfide is about 4:1 to about 16:1, and wherein the molar ratio of said water to said organic amide is about 0.6:1 to about 1.2:1.

9. A process according to claim 8 wherein the molar ratio of the sum of alkali metal carbonate and alkali metal hydroxide in said mixture to said alkali metal hydrosulfide is about 1.0:1 to about 1.1:1.

10. A process according to claim 9 wherein the molar ratio of said dihaloaromatic sulfone to said alkali metal hydrosulfide is about 0.9:1 to about 1.2:1.

11. A process according to claim 10 wherein said at least one member (5) is a mixture of alkali metal carbonate with alkali metal hydroxide having a mole percent alkali metal carbonate of about 5 to about 40.

12. A process according to claim 11 wherein said at least one dihaloaromatic sulfone is bis(4-chlorophenyl) sulfone, said at least one organic amide is N-methyl-2-pyrrolidone, said at least one alkali metal hydrosulfide is sodium hydrosulfide, said alkali metal carbonate is sodium carbonate and said alkali metal hydroxide is sodium hydroxide.

13. A process according to claim 10 wherein said carbon dioxide is charged in gaseous form.

* * * * *